3,262,163
CAST WELDING APPARATUS AND METHOD
Leonard Gelfand, South Euclid, Ohio, assignor to Erico Products, Inc., Cleveland, Ohio, a corporation of Ohio
Filed June 3, 1963, Ser. No. 285,024
10 Claims. (Cl. 22—58)

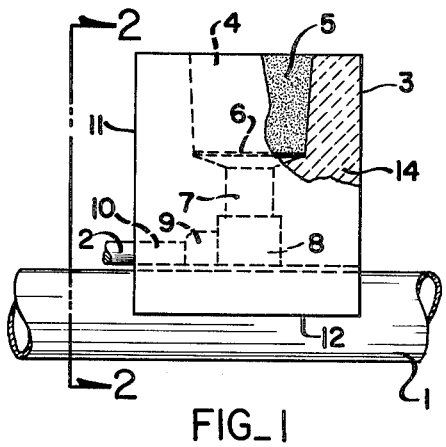
FIG_1
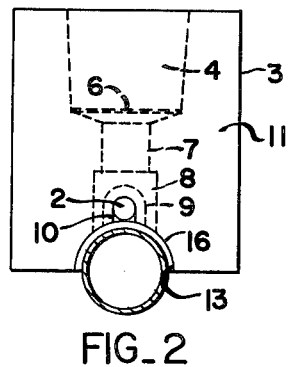
FIG_2
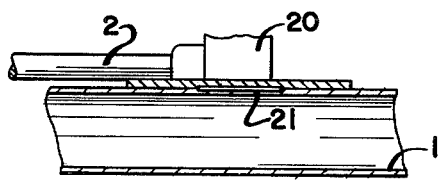
FIG_3
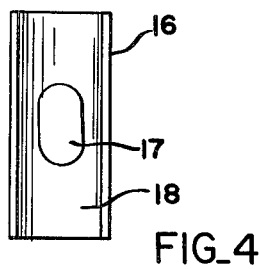
FIG_5
FIG_4
INVENTOR.
LEONARD GELFAND

United States Patent Office 3,262,163
Patented July 26, 1966

This invention relates generally, as indicated, to cast welding apparatus and method and more particularly to a method and apparatus for utilizing metal-producing exothermic reaction mixtures for the joining of conductors and the like to thin wall tubing.

Exothermic reaction mixtures, such as disclosed in Cadwell U.S. Patent No. 2,229,045, have long been employed for producing charges of molten metal suitable for cast welding cathodic protection cables to steel pipelines, and the like. The molten metal for the cast welding operation is produced by igniting a powder containing certain specific ingredients. The temperature of the molten metal produced may range from 3500° F. to as high as 5500° F. Reference may be had to Rejdak U.S. Patent No. 3,033,672 for a disclosure of mixtures producing a molten metal having such high temperatures.

Today, more and more tubing is being made of high strength materials having quite thin walls. Also, plastic coated, thin walled pipe is gaining acceptance in such uses as gas pipe lines. At pipe joints, it is necessary to remove the plastic coating and electrolytic corrosion at such joint may be inhibited by cathodic protection. Heretofore, it has been extremely difficult to attach cathodic protection conductors and the like to such thin wall tubing because of the extreme heat and metal erosion created by the high temperatures of the exothermic reaction mixture. Normal exothermic reaction procedure would, of course, melt through the thin pipe wall and damage any plastic coating thereon. Accordingly, the advantages of employing exothermic reaction mixtures in the welding of conductors to thin wall pipe has generally not heretofore been available.

It is, therefore, a principal object of the present invention to make available exothermic reaction welding methods and apparatus for the attachment of conductors and the like to thin wall items such as pipes.

Another principal object of the present invention is the provision of a method and apparatus for the convenient attaching of cathodic protection or grounding conductors to thin walled pipes while not deleteriously affecting such pipes.

Another object is the provision of a method for joining a conductor to a thin walled pipe by means of a heat shield, to which the conductor is cast welded and which is simultaneously brazed to the pipe.

Still another object is the provision of such method which utilizes the heat generated by such cast welding to braze the shield to the pipe.

Yet another object is the provision of apparatus for joining a conductor and the like to thin walled tubing which includes a welding shield to which the conductor is cast welded and which is simultaneously secured to such tubing to become a part of the finished joint.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:
FIG. 1 is a side elevation partially broken away and in section of apparatus for joining a conductor to thin wall tubing in accordance with the present invention;
FIG. 2 is a vertical section of such apparatus taken substantially on the line 2—2 of FIG. 1;
FIG. 3 is a longitudinal fragmentary section of the pipe and the completed joint;
FIG. 4 is a bottom plan view of the welding shield illustrating the brazing material predeposited on the internal surface thereof; and
FIG. 5 is an end elevation of such welding shield.

Referring now to the drawing with more particularity, and especially to FIGS. 1 and 2, a thin wall tube 1 may have connected thereto an elongated number 2 such as a copper conductor for a cathodic protection system by means of the apparatus illustrated. Such apparatus includes a graphite mold 3 which may be composed of a solid graphite block or separable block halves held together by a toggle clamp in conventional manner. In any event, the graphite mold 3 is provided with a top chamber 4 or crucible for holding a powder charge 5 of exothermic reaction materials which may be ignited to form molten weld metal. Such charge 5 may be supported on a fusible disc 6 of, for example, copper, which will disintegrate when the charge 5 is ignited permitting the molten metal thus formed to drop through a sprue opening 7 into chamber 8.

The chamber 8 for receiving the molten metal includes a lateral projection 9 which terminates in an elongated member receiving tunnel 10 which projects from the chamber enlargement 9 through the face 11 of the graphite mold block 3. The bottom surface 12 of the block 3 is provided with a semicylindrical central recess 13 which extends entirely between the opposite faces 11 and 14 of the block 3. The chamber, its enlargement 9, and the work receiving tunnel passageway 10 are all exposed to the arcuate recess 13 in the bottom 12 of the block 3.

A welding shield 16 of semicylindrical shape is situated in the semicylindrical recess 13 in the bottom 12 of the mold 3 and preferably has an I.D. slightly larger than the O.D. of the thin-walled tube 1. This then affords an easy fit between the shield and the tube, but care should be taken that the difference is not too great since the brazing employed to attach the shield to the tube depends upon a fairly good fit. The shield 16 may be of the same longitudinal dimension as the distance between the faces 11 and 14 of the mold 3, this serving as a guide properly to position the mold on the shield. The shield 16 is then interposed between the tube 1 and the chamber 8 in the mold 3. The shield then serves to close the bottom of the chamber 8, its extension 9 and the tunnel passage 10 for the work 2. The shield 16 serves to protect the tube 1 from the major heat of the exothermic reaction and the molten metal dropping into the chamber 8 and any erosion that occurs will occur in the shield 16 instead of the tube 1. If desired, a refractory batt or gasket material may be interposed between the shield 16 and the bottom of the refractory mold to keep the molten metal from passing therebetween. The illustrated shield may be made of steel mainly for economy purposes and is of sufficient thickness to protect the tube but yet thin enough to transmit brazing heat. Copper has been found to work as well and it will be understood that other materials for the shield having sufficient melting points may be employed.

The procedure for connecting the conductor 2 to the thin wall tube 1 may then be as follows. The shield 16 will be bright cleaned both interiorly and exteriorly and especially at the center thereof. Also the exterior of the tube 1 at the point of connection should also be bright cleaned. If the tube is plastic coated, such coating may be removed and any undercoating also removed with a good grade of naphtha or other residue-free solvent. The area of coating removal may be approximately the same size as the area 17 shown in FIG. 4. A thin film of brazing flux may then be placed on the tube at the point of connection. The welding shield 16 may then be "presilvered" as indicated at 17 on the interior surface 18 thereof at the approximate longitudinal center. The welding shield is then placed in position on the fluxed area of the tube 1. The conductor 2 and the mold 3 are now positioned on the welding shield 16 and spring-chain clamps may be employed on the mold frame to hold the apparatus to the tube 1. The crucible is then filled with a cartridge of the exothermic reaction material and ignited. The disc 6 then fuses permitting the molten metal to drop downwardly through the sprue opening 7 into the chamber 8 cast welding the conductor 2 to the welding shield 16. The end of the conductor 2 will, of course, project into the chamber 8 so that the molten metal will flow therearound and into the chamber extension 9 firmly securing the conductor to the shield 16. The heat generated by the cast welding operation will then be transferred through the heat shield to the silver braze material causing the same to fuse. The mold is generally left in position for one to one and one-half minutes to allow the low melting point braze completely to solidify securing the shield 16 to the tube 1. As a brazing material, conventional silver brazing alloys containing ten to eighty percent silver, with the balance principally copper and zinc, may be employed. The melting points of these alloys are in the range of 1175 to 1500° F. which is higher than for soft solders but considerably below the aforementioned temperatures created by the ignition of the exothermic reaction material. Such silver brazing alloys may be employed to join both ferrous and the higher melting point non-ferrous alloys. While silver brazing alloys have successfully been employed, it will be understood that other alloys such as brazing spelter containing equal proportions of copper and zinc and melting at around 1600° F. may also be employed.

It can now be seen that brazing material is heated to its melting point by the molten metal in chamber 8, cast welding the conductor 2 to the welding shield 16. This heat, however, will in no way affect the thin wall tube 1 or have any deleterious effects on a plastic coating which may be employed therein.

Referring now to FIG. 3, it will be seen that the completed joint comprises the conductor 2 welded by the cast metal 20 to the welding shield 16 which in turn has been silver brazed at 21 to the thin wall tube 1.

The braze material 17 predeposited on the other side of the welding shield 16 will be properly located directly beneath the chamber 8 by centrally disposing the material 17 on the shield 16 and then properly locating the shield 16 in the recess 13 since the chamber 8 is centrally disposed between the faces 11 and 14 of the block 3. The brazing material is then directly beneath the weld cavity 8 and best transfer of heat therefrom then results. While the conductor 2 may be copper and the tube 1 steel, it will readily be appreciated that other materials may equally well be joined in the illustrated manner. For example, copper, stainless steel and even aluminum may be joined in this manner. If the tube 1 extends vertically as in the case of piling, for example, a separate crucible may be employed with an elbow passage leading therefrom to the weld chamber 8. In any event, the spring-chain clamp will suffice to secure the apparatus to the work. For examples of the particular exothermic reaction mixtures which may be employed with the present invention, reference may be had to the aforementioned Cadwell and Rejdak patents.

It can now be seen that there is provided a method of and apparatus for joining conductors and the like to thin wall tubing wherein the conductor is cast welded to a heat shield and the heat generated thereby is simultaneously employed to braze the shield to the tube. The conductor is then connected to the shield and the shield connected to the tube by the same heat energy.

Other modes of applying the principle of the invention may be employed, change being made as regards the details described, provided the features stated in any of the following claims or the equivalent of such be employed.

I, therefore, particularly point out and distinctly claim as my invention:

1. The method of joining a conductor to a thin wall tube comprising the steps of cast welding such conductor to a heat shield and simultaneously brazing such shield to such tube.

2. The method of claim 1 including the step of utilizing the heat generated by such cast welding to braze such shield to such tube.

3. The method of joining a member to a thin wall tube comprising the steps of placing a thin film of brazing flux on such tube at the point of joining, placing a presilvered welding shield on the fluxed area of such tube with such presilvering being vis-a-vis such brazing flux, cast welding such member to such welding shield and utilizing the heat of such cast welding to braze such shield to such tube.

4. The method of claim 3 including the step of placing a crucible and mold on such shield with the latter enclosing such member, igniting a charge of exothermic reaction material in such crucible to form molten cast welding metal, causing such molten metal to flow into such mold and leaving such mold in positon for a predetermined time to cause such braze completely to solidify.

5. The method of joining a conductor to a thin walled tube comprising the steps of cast welding such conductor to a welding shield, such welding shield being of sufficient thickness to withstand the major heat and erosion of the cast weld metal while nevertheless transferring sufficient heat therethrough to braze such shield to such tube.

6. Apparatus for joining a conductor to a thin wall tube comprising a graphite mold having a weld chamber therein adapted to enclose the end of such conductor, a welding shield opposed to such chamber, means operative to introduce molten metal into such chamber to cast weld such conductor to said shield, and means responsive to the heat of such molten metal operative to braze said shield to such thin wall tube.

7. Apparatus as set forth in claim 6 wherein said welding shield comprises a semicylindrical member having an I.D. slightly larger than the O.D. of the thin wall tube.

8. Apparatus as set forth in claim 7 including a brazing alloy applied to the interior of said shield opposite such weld chamber.

9. Apparatus as set forth in claim 6 wherein said molten metal is produced by igniting a charge of exothermic reaction material.

10. The method of joining a conductor to a thin wall tube comprising the steps of cast welding such conductor to a heat shield adjacent such tube, and utilizing the heat generated by such cast welding to braze such shield to such tube.

References Cited by the Examiner

UNITED STATES PATENTS

| | | | |
|---|---|---|---|
| 2,228,087 | 1/1941 | Rose | 29—497 X |
| 2,735,163 | 2/1956 | Brooks et al. | 29—527 X |
| 2,990,593 | 7/1961 | Burke | 22—203 X |

J. SPENCER OVERHOLSER, *Primary Examiner.*